United States Patent [19]

Tanaka et al.

[11] 4,251,652

[45] Feb. 17, 1981

[54] POLYETHERESTER BLOCK COPOLYMER AND PROCESS FOR PRODUCING THE SAME

[75] Inventors: Chiaki Tanaka, Chita; Yoko Furuta; Nagayoshi Naito, both of Nagoya, all of Japan

[73] Assignee: Toray Industries, Inc., Tokyo, Japan

[21] Appl. No.: 42,868

[22] Filed: May 29, 1979

[30] Foreign Application Priority Data

Jun. 5, 1978 [JP] Japan .................................. 53-66662

[51] Int. Cl.$^3$ ............................................. C08G 63/66
[52] U.S. Cl. ..................................... 528/279; 525/437; 528/283; 528/301
[58] Field of Search ................. 525/437; 528/301, 279, 528/309, 283

[56] References Cited

U.S. PATENT DOCUMENTS

| | | | |
|---|---|---|---|
| 3,013,914 | 12/1961 | Willard | 154/43 |
| 3,023,192 | 2/1962 | Shivers | 260/75 |
| 3,663,653 | 5/1972 | Frohlich et al. | 260/860 |
| 3,701,755 | 10/1972 | Sumoto et al. | 260/75 R |
| 3,944,516 | 3/1976 | Petke | 260/40 R |
| 4,130,603 | 12/1978 | Tanaka et al. | 260/860 |

FOREIGN PATENT DOCUMENTS

49-31795  3/1974  Japan .

*Primary Examiner*—Earl A. Nielsen
*Attorney, Agent, or Firm*—Miller & Prestia

[57] ABSTRACT

A polyetherester block copolymer having enhanced compatibility of soft polyether segments with hard polyester segments thereof, excellent mechanical strength, a proper melt fluidity and enhanced resistance to chemicals, heat and light, which copolymer comprises (1) 50 to 95% by weight of polyester segments comprising a dicarboxylic acid component containing at least 50 molar percent of terephthalic acid and a diol component containing at least 50 molar percent of 1,4-butane diol and (2) 5 to 50% by weight of polyether segments comprising poly(tetramethylene oxide)glycol, which is characterized by a large number average molecular weight of from 1,500 to 2,500 and by a small variance of less than 1.70 in molecular weight distribution.

23 Claims, No Drawings

POLYETHERESTER BLOCK COPOLYMER AND PROCESS FOR PRODUCING THE SAME

FIELD OF THE INVENTION

The present invention relates to a polyetherester block copolymer and processes for producing the same. More particularly, the present invention relates to a polyetherester block copolymer having an enhanced melt fluidity, proper thermal properties, an excellent rubber-like elasticity and an enhanced compatibility of the polyester segments with the polyether segments in the block copolymer.

BACKGROUND OF THE INVENTION

Conventional polyetherester block copolymers comprising hard polyester segments, mainly comprises polybutylene terephthalate, and which are block polycondensed with soft polyether segments, mainly comprises poly(tetramethylene oxide)glycol, have not only a high thermoplasticity but, also, a proper softness, rubber-like elasticity, mechanical strength, resistance to chemicals and oils and thermal resistance. Therefore, it is well known that the conventional polyetherester block copolymer can be processed in the same manner as that usually applied to other thermoplastic polymers. Due to thermoplastic property, the polyetherester block copolymers are useful in the rubber and soft plastic industry fields.

Usually, the soft polyether segments in the conventional polyetherester block copolymers which are now commercially available, consist essentially of a poly(tetramethyleneoxide)glycol having a number average molecular weight less than about 1,500, preferably, of about 1,000. This limitation in the number average molecular weight of the poly(tetramethylene oxide)glycol is due to the fact that the soft polyether segments consisting of the poly(tetramethylene oxide)glycol are believed to be compatible with the hard polyester segments only when the poly(tetramethylene oxide)glycol has a number average molecular weight less than 1,500. The conventional poly(tetramethylene oxide)glycol which are now commercially available and has a number average molecular weight of 1,500 or more, exhibits a large variance ($\alpha$) in molecular weight distribution of more than 1.70. The term "variance in molecular weight distribution", used herein, will be clarified in detail hereinafter. For example, the comercially available poly(tetramethylene oxide)glycol having a number average molecular weight of about 2,000, usually exhibits a molecular weight distribution variance of from 1.9 to 2.5.

When the poly(tetramethylene oxide)glycol having a number average molecular weight of 1,500 or more is used for forming the soft polyether segments, the resultant polyetherester block copolymer has a disadvantage in that the soft polyether segments exhibit a poor compatibility with the hard polyester segments. Accordingly, the soft polyether segments constitute their own phase separated from the phase consisting of the hard polyester segments not only in a solid state but, also, in a melted state of the polyetherester block copolymer. The melted state of the above-mentioned type of polyetherester block copolymer is opaque and exhibits a milky white color and pearly shine due to the phase separation of the polyether segments from the polyester segments. This phase separation causes the polyetherester block copolymer in the melted state to exhibit a poor fluidity and shaping property and the solidified copolymer to exhibit a poor mechanical strength and elasticity.

It is known that, in general, the larger the number average molecular weight of the poly(tetramethylene oxide)glycol, the higher the thermal properties, for example, melting point, crystallizing property, the mechanical strength at an elevated temperature and the injection molding property of the resultant polyetherester block copolymer. However, it is also known from Japanese Patent Application Laying-open No. 49-31795(1974) that the large number average molecular weight of the poly(tetramethylene oxide)glycol causes the resultant polyetherester block copolymer to exhibit a large degree of phase separation of the soft polyether segments from the hard polyester segments. This large degree of phase separation results in a poor uniformity in quality of the polyetherester block copolymer. The above-mentioned Japanese Patent Application Laying-open No. 49-31795 also discloses that, in order to prevent the phase separation of the soft polyether segments consisting of poly(tetramethylene oxide)glycol having a number average molecular weight of about 2,000, from the hard polyester segments, the poly(tetramethylene oxide)glycol segments should be contained in a proportion of 50% or more by weight, for example, 60% in the block copolymer. The large proportion of the poly(tetramethylene oxide)glycol segments naturally causes the proportion of the polyester segments to be small. The small proportion of the polyester segments naturally causes the polyetherester block copolymer to exhibit a poor crystallinity, mechanical strength, processability, and resistance to each of chemicals, heat and light.

Under the above-mentioned circumstances, in order to obtain the polyetherester block copolymer having a proper processability, the poly(tetramethylene oxide)glycol having a small number average molecular weight of about 1000 or less is used. The resultant polyetherester block copolymer has a relatively high compatibility of the soft polyether segments thereof with the hard polyester segments, and a relatively low melting point, crystallizing property and mechanical strength.

SUMMARY OF THE INVENTION

An object of the present invention is to provide a polyetherester block copolymer comprising soft polyether segments highly compatible with hard polyester segments, not only in a solid state but, also, in a melted state of the polyetherester block copolymer.

Another object of the present invention is to provide a polyetherester block copolymer having an excellent melt tension, high mechanical strength, excellent elasticity, and proper melting and crystallizing temperatures, and processes for producing the same.

The above-mentioned objects can be attained by the polyetherester block copolymer of the present invention which comprises:

(1) 50 to 95% by weight of polyester block segments comprising:
   (A) a dicarboxylic acid component which comprises at least 70 molar percent of at least one aromatic dicarboxylic acid having a molecular weight of 300 or less and including, as an indispensable dicarboxylic acid component, at least 50 molar percent of terephthalic acid, and which is polycondensed with:

(B) a diol component which comprises at least 70 molar percent of at least one aliphatic diol having a molecular weight of 250 or less and including, as an indispensable diol component, at least 50 molar percent of 1,4-butanediol,
said polyester block segments being polycondensed with:

(2) 5 to 50% by weight of polyether block segments comprising poly(tetramethylene oxide)glycol, characterized in that said poly(tetramethylene oxide)glycol has a number average molecular weight of from 1,500 to 2,500 and a variance ($\alpha$) in molecular weight distribution, satisfying the equation (1):

$$\alpha = (Mv/Mn) < 1.70 \quad (1)$$

wherein Mn represents a number average molecular weight of said poly(tetramethylene oxide)glycol and Mv represents a viscosity average molecular weight of said poly(tetramethylene oxide)glycol, defined by the equation (2):

$$Mv = \text{anti log } (0.493 \log \mu + 3.0646) \quad (2)$$

wherein $\mu$ represents a melt viscosity in poise of said poly(tetramethylene oxide)glycol at a temperature of 40° C.

The polyetherester block copolymer can be produced by a process comprising the steps of:
(a) bringing at least one lower alcohol diester of the dicarboxylic acid component into a catalytic ester-interchange reaction with the diol component and the poly(tetramethylene oxide)glycol, and (b) polycondensing the ester-interchange reaction products to prepare the polyetherester block copolymer.

The polyetherester block copolymer can be produced by another process which comprises the steps of:
(a) catalytically esterifying the diol component and the poly(tetramethylene oxide)glycol with the dicarboxylic acid component, and
(b) catalytically polycondensing the esterification products to prepare the polyetherester block copolymer.

The polyetherester block copolymer also can be produced by still another process which comprises the steps of:
(a) catalytically polycondensing the dicarboxylic acid component with the diol component, and
(b) catalytically block polycondensing the polycondensation product in Step (a) with the poly(tetramethylene oxide)glycol.

DETAILED DESCRIPTION OF THE INVENTION

The polyetherester block copolymer of the present invention is composed of from 50 to 95%, preferably, from 55 to 75%, by weight of hard polyester segments which are polycondensed with from 5 to 50%, preferably, from 25 to 45%, by weight of soft polyether segments: The hard polyester block segment comprises a dicarboxylic acid component and a diol component polycondensed with the dicarboxylic acid component. The dicarboxylic acid component comprises at least 70 molar percent of at least one aromatic dicarboxylic acid having a molecular weight of 300 or less. It is important that the dicarboxylic acid component contains, as an indispensable aromatic dicarboxylic acid, at least 50 molar percent of terephthalic acid.

The diol component comprises at least 70 molar percent of at least one aliphatic diol having a molecular weight of 250 or less. It is important that the diol component contains, as an indispensable aliphatic diol, at least 50 molar percent of 1,4-butanediol.

Accordingly, the polyester block segments comprise at least 70 molar percent of ester ingredients of at least one aromatic dicarboxylic acid having a molecular weight of 300 or less with at least one aliphatic diol having a molecular weight of 250 or less. Also, the polyester segments comprise at least 50 molar percent of ester ingredient of terephthalic acid with 1,4-butanediol, that is, butylene terephthalate ingredient.

The aromatic dicarboxylic acid usable for the present invention and different from terephthalic acid can be selected from the group consisting of isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid and 3-sodium-sulpho-isophthalate.

The dicarboxylic acid component may contain, in addition to the aromatic dicarboxylic acid, 30 molar percent or less of at least one additional dicarboxylic acid different from the aromatic dicarboxylic acids. The additional dicarboxylic acid may be selected from the group consisting of, for example, cycloaliphatic dicarboxylic acids, for instance, 1,4-cyclohexane dicarboxylic acid, and aliphatic dicarboxylic acids, for instance, succinic acid, oxalic acid, adipic acid, sebacic acid, dodecane dicarboxylic acid and dimeric acid.

The dicarboxylic acid to be converted into the polyester segments, may be either in the form of a free acid or in the form of an ester-forming or ester-interchanging derivative thereof, for instance, a lower alkyl ester, aryl ester, carboxylic ester, or acid chloride.

The aliphatic diol having a molecular weight of 250 or less and being exclusive of 1,4-butanediol, may be selected from the group consisting of ethylene glycol, trimethylene glycol, pentamethylene glycol, hexamethylene glycol, neopentyl glycol and decamethylene glycol. The diol component may contain, in addition to the aliphatic diol, 30 molar percent or less of at least one additional diol different from the aliphatic compound. The additional diol may be selected from, for example, cycloaliphatic diols, for instance, 1,1-cyclohexane dimethanol, 1,4-cyclohexane dimethanol and tricyclodecane dimethanol, and aromatic diols, for instance, xylylene glycol, bis(p-hydroxy)diphenyl, bis(p-hydroxyphenyl)propane, 2,2-bis[4-(2-hydroxyethoxy)phenyl]propane,[-bis 4-(2-hydroxy)phenyl]sulphone, 1,1-bis 4-(2-hydroxyethoxy)phenyl]cyclohexane.

The diol compound to be converted into the polyester block segments, may be used in the form of a free diol or in the form of an ester-forming derivative, for example, acetylated diol or alkali metal salts.

The polybutylene terephathalate ingredient which has been derived from the terephthalic acid and the 1,4-butanediol, is indispensable for the hard polyester segments in the polyetherester block copolymer of the present invention, because the polybutylene terephtatate ingredient is effective for causing the resultant polyester segments to exhibit a high crystallizing rate and the resultant polyetherester block copolymer to exhibit a short cycle injection-moldability, a proper rubber-like elasticity, mechanical strength, and resistance to heat and chemicals.

The soft polyether segments in the polyetherester block copolymer of the present invention are composed of poly(tetramethylene oxide)glycol which is characterized by a larger number average molecular weight of from 1,500 to 2,500 and a small variance ($\alpha$) in molecular weight distribution satisfying the equation (1):

$$\alpha = Mv/Mn < 1.70 \quad (1)$$

wherein Mn represents a number average molecular weight of said poly(tetramethylene oxide)glycol and Mv represents a viscosity average molecular weight of said poly(tetramethylene oxide)glycol, defined by the equation (2):

$$Mv = \text{anti log } (0.493 \log \mu + 3.0646) \quad (2)$$

wherein $\mu$ represents a melt viscosity in poise of said poly(tetramethylene oxide)glycol at a temperature of 40° C.

In the polyetherester block copolymer of the present invention, it is essential that the poly(tetramethylene oxide)glycol have a large number average molecular weight of 1,500 to 2,500 and a small molecular weight distribution variance $\alpha$ of less than 1.70. The number average molecular weight of poly(tetramethylene oxide)glycol can be determined from the OH value and the acid value of poly(tetramethylene oxide)glycol according to the procedure which will be hereinafter described. In general, in the conventional poly(tetramethylene oxide)glycol, the larger the number average molecular weight thereof, the larger the molecular weight distribution variance ($\alpha$). As stated hereinbefore, the commercially available conventional poly(tetramethylene oxide)glycol having a number average molecular weight of about 2,000, usually exhibits a variance in molecular weight distribution of from 1.9 to 2.5. If this type of poly(tetramethylene oxide)glycol is used, in an amount of from 5 to 50% by weight, the resultant polyetherester block copolymer will exhibit a poor compatibility of the polyether segments and the polyester segments. Therefore, in this case, the polyether segments are significantly phase separated from the polyester segments. In order to prevent the phase separation, it is necessary that the poly(tetramethylene oxide)glycol segments be contained in a large proportion of 60% by weight or more in the polyetherester copolymer. However, the large proportion of the polyether segments naturally causes the proportion of polyester segments to be small and, the resultant polyetherester block copolymer to exhibit poor crystallizing property, mechanical strength, resistance to chemicals, heat and light, and a relatively low melting point and glass transition point.

In the case of the polyetherester block copolymer of the present invention, due to the small value of less than 1.70 of the molecular weight distribution variance of the poly(tetramethylene oxide)glycol, no phase separation of the polyether segments from the polyester segments is found either in the solid state or in the melted state of the polyetherester block copolymer, in spite of the small proportion of from 5 to 50% by weight and the large number average molecular weight of from 1,500 to 2,500, of the poly(tetramethylene oxide)glycol segments.

Due to the large number average molecular weight of the poly(tetramethylene oxide)glycol segments, the polyetherester block copolymer of the present invention exhibits an increased melting and crystallizing temperatures, an accellerated crystallization, an enchanced rubber-like elasticity, a high mechanical strength at a high temperature and, also, at a low temperature, and a proper softness.

If the proportion of the polyether segments is smaller than 5% by weight, the resultant polyetherester block copolymer will exhibit a poor elasticity and softness. If the proportion of the polyether segments is larger than 50% by weight, the resultant polyetherester block copolymer will exhibit a poor mechanical strength and crystallizing property and debilitated resistance to chemicals, heat and light.

If the number average molecular weight of the poly(tetramethylene oxide)glycol is smaller than 1,500, it will cause the resultant polyetherester block copolymer to exhibit a poor elasticity and crystallizing property. Also, if the number average molecular weight of the poly(tetramethylene oxide)glycol is larger than 2,500, it will reflect a poor compatibility of the polyether segments and the polyester segments. Furthermore, the molecular weight distribution variance of the poly(tetramethylene oxide)glycol of 1.70 or more will result in a poor compatibility of the polyether segments and the polyester segments in the resultant polyetherester block copolymer.

It is preferable that the polyetherester block copolymer have an inherent viscosity of 0.6 or more, more preferably, of from 0.9 to 3.0, which has been determined at a concentration of 0.5% by weight in o-chlorophenol at a temperature of 30° C.

Also, it is preferable that the polyetherester block copolymer of the present invention have a number average molecular weight of more than 15,000, more preferably, of from 20,000 to 100,000.

The poly(tetramethylene oxide)glycol having a molecular weight distribution variance smaller than 1.70 can be produced by properly controlling the polymerization conditions and/or by using a properly selected catalyst. For example, this type of poly(tetramethylene oxide)glycol may be prepared by a process disclosed in T. G. Groucher et al, polymer, 17, 205 (1976), Canadian Patent No. 800,659 or Japanese Patent Application Publication No. 52-32797(1977) or 52-32798(1977). However, the preparation of the poly(tetramethylene oxide)glycol usable for the present invention, is not limited to the special processes mentioned above. The poly(tetramethylene oxide)glycol having a small variance in molecular weight distribution may be produced by any types of processes, for example, by a special cationic polymerization process under a limited special condition, or by separating and collecting a poly(tetramethylene oxide)glycol fraction having a desired variance in the molecular weight distribution from a poly(tetramethylene oxide glycol) matrix. This poly(tetramethylene oxide)glycol fraction having the desired molecular weight distribution variance may be prepared by way of depolymerization of the poly(tetramethylene oxide)glycol having a broad molecular weight-distribution.

The polyetherester block copolymer of the present invention can be produced in a process which comprises the steps of (a) bringing, at a temperature of from 160° to 230° C., at least one lower alcohol diester of at least one dicarboxylic acid which corresponds to the dicarboxylic acid component of the desired polyetherester block copolymer, into a catalytical ester-interchange reaction with at least one diol which corresponds to the diol component of the desired polyetherester block copolymer and with the poly(tetramethylene oxide)glycol, and then, (b) polycondensing the ester-interchange reaction products into a polyetherester block copolymer at a temperature of from 210° to 270° C. In this process, the lower alcohol preferably has 1 to 4 carbon atoms, and may be selected from the group consisting of methyl alcohol, ethyl alcohol, propyl alcohol and butyl alcohol. In the ester-interchange reaction, the diol is used in a stoichiometrically excessive amount on the basis of the amount of the dicarboxylic acid used.

In another process for producing the polyetherester block copolymer of the present invention, (a) at least one diol corresponding to the diol component of the desired polyetherester block copolymer and the poly(tetramethylene oxide)glycol are catalytically esterified with at least one dicarboxylic acid corresponding to the dicarboxylic acid component of the desired polyetherester block copolymer at a temperature of from 160° to 235° C., and then, (b) the resultant esterification products are subjected to a polycondensation at a temperature of from 210° to 270° C.

The polyetherester block copolymer of the present inveniton can be produced by still another process which comprises the steps of (a) polycondensing, at a temperature of from 210° to 270° C., at least one dicarboxylic acid corresponding to the dicarboxylic acid component with at least one diol corresponding to the diol component in the desired polyetherester block copolymer, to provide a polyester corresponding to the desired polyester segments, and then, polycondensing the resultant polyester in Step (a) with the poly(tetramethylene oxide)glycol at a temperature of from 200° to 250° C. In this process, the polyester obtained in Step (a) may be mixed with additional dicarboxylic acid and/or diol or another polyether in addition to the poly(tetramethylene oxide)glycol, and the resultant mixture may be subjected to the polycondensation operation. In the aforegoing processes, each of the ester-interchange reaction, the esterification reaction, and the polycondensation reaction can be carried out in the presence of a catalyst comprising at least one member selected from the group consisting of tetralkyl titanates, for example, tetrabutyl titanate and tetramethyl titanate; alkali-metal-titanium oxalate, for example, potassium titanate oxalate; tin-containing compounds, such as dibutyl tin oxide and dibutyl tin salts of fatty acids, for example, dibutyl tin laurate, and; lead-containing compounds, such as lead salts of aliphatic acids, for example, lead acetate.

The polyester segments in the polyetherester block copolymer of the present invention may contain, as a co-polycondensing component, a polycarboxylic acid, for example, 1,2,3,4-butanetetracarboxylic acid, trimellitic acid, trimesic acid, pyromellitic acid and benzophenone tetracarboxylic acid; polyfunctional hydroxyl compounds, for example, glycerol and pentaerythritol; polyfunctional oxy acid, for example, malic acid, citric acid, tartaric acid, 3-hydroxyglutaric acid; ester-interchanging esters of the above-mentioned acid, and; alkyl ester compounds and acid anhydrides of the above-mentioned acids. However, in this case, the copolycondensing component mentioned above, should be in an amount of 3 molar percent or less. The copolycondensing components are effective for increasing the melt viscosity of the resultant block copolymer.

One or more stabilizer selected from anti-oxidants, anti-thermal decomposing agents and ultraviolet ray-absorbers may be added to the poyetherester block copolymer of the present invention in any stage during the producing process for the copolymer or after the producing process is completed. The anti-oxidants and the anti-thermal decomposing agents may be selected from, for example, the group consisting of hindered phenol compounds, for instance, 4,4'-bis(2,6-di-tert-butyl-phenol), 1,3,5-trimethyl-2,4,6-tris(3,5-di-tert-butyl-4-hydroxybenzyl)benzene, tetraxis[methylene-3(3,5-di-tert-butyl-4-hydroxyphenyl)propionate)methane, N,N'-hexamethylene-bis(3,5-di-tert-butyl-4-hydroxyhydrocinnamoylamide); aromatic amine compounds, for instance, N,N'-bis($\beta$-naphthyl)-p-phenylenediamine and 4,4'-bis($\alpha,\alpha$-dimethylbenzyl)diphenylamine; sulphur-containing organic compounds, for instance, dilaurylthiodipropionate; phosphorus containing organic compounds, for instance, phosphoric acid and triphenyl phosphite; alkalline earth metal oxides, for instance, calcium oxide and magnesium oxide, and; nickel salts of Schiff bases, for instance, nickel salt of salicylidene-4-aminopyridine and nickel salt of salicilidene-2,4-dichloroaniline.

The ultraviolet-ray absorbing agent may be selected from, for example, the group consisting of substituted benzophenone compounds, for instance, 2-hydroxy-4-benzoyloxy benzophenone and 2-hydroxy-4-n-octoxy benzophenone; benzotriazol compounds, for example, 2(2'-hydroxy-3',5'-di-tert-butylphenyl)-5-chlorobenzotriazole, and piperidine compounds, for instance, bis(2,2,6,6,-tetramethyl-4-piperidine)sebacate and 4-benzoyloxy-2,2,6,6-tetramethyl-piperidine.

The polyetherester block copolymer of the present invention may contain any additives, for example, hydrolytic stabilizers, coloring materials (dyes and pigments), anti-static agents, electrical conductors, fire-retardants, reinforcing materials, fillers, lubricants, nucleating agents, mold-release agents, plasticizers and adhesives, in an optional amount.

The following specific examples are presented for the purpose of clarifying the present invention. However, it should be understood that these are intended only to be examples of the present invention and are not intended to limit the present invention in any way.

In the examples, unless otherwise indicated, all parts and percentages are by weight. Also, all values of inherent viscosity of the polymers indicated in the foregoing description and the following examples are values determined by using a solution of 0.5% by weight of the respective polymer in o-chlorophenol at a temperature of 30° C.

EXAMPLE 1 and Comparison Examples 1 and 2

In Example 1, a reaction vessel having a helical ribbon-shaped agitating screw was charged with 135 parts of dimethyl terephthalate, 103 parts of poly(tetramethylene oxide) glycol having a molecular weight distribution variance $\alpha$ of 1.50 and a number average molecular weight of 2,000, and 94.5 parts of 1,4-butanediol, as well as 0.10 parts of a catalyst consisting of titanium tetrabutoxide. The reaction mixture in the reacting vessel was heated at a temperature of 210° C. for 2 hours, so as to evaporate and remove the generated methyl alcohol in an amount corresponding to 95% of the entire theoretial amount of the generated methyl alcohol, from the reaction mixture. Thereafter, 0.42 parts of Irganox 1010, which is a trademark of an anti-oxidant made by Chiba Geigy Corp., was added to the reaction mixture. The temperature of the reaction admixture was elevated by heating the admixture to 245° C. and the pressure of the reaction system was reduced to an absolute pressure of 0.2 mmHg over 50 minutes. The reaction admixture was subjected to polymerization under the above-mentioned condition for 2 hours. A transparent, viscous polymer was obtained. The polymer was extruded through an orifice into water and solidified therein, to form a gut or monofilament having a diameter of about 3 mm. The gut was taken up by a take-up machine and, then, cut to prepare pellets of the polymer. The resultant polyetherester pellets had a melting point of 219° C. and an inherent viscosity of 0.95. The take-up operation of the gut could be smoothly carried out without any difficulty. It was observed that when extruded into water, the gut was immediately solidified to form white-colored gut and no sticking property of the gut was found.

In each of the Comparison Examples 1 and 2, the same procedures as those mentioned above were carried out, except that the poly(tetramethylene oxide) glycol used in Comparison Example 1 had a number average molecular weight of 2,000 and a molecular weight distribution variance $\alpha$ of 2.13, and the poly(tetramethylene oxide) glycol used in Comparison Example 2 had a number average molecular weight of 2,000 and a molecular weight distribution variance $\alpha$ of 1.97.

In each of the polymerization processes in Comparison Examples 1 and 2, when the pressure reached an absolute value of 50 mmHg 30 minutes after the start of the pressure reduction, the polymerization mixture became cloudy so as to form a milky colored, pearly shining melt. When extruded from the polymerization vessel through an orifice, the melt of the resultant polymer exhibited a significant Barus effect, and when taken up, the extruded melt stream exhibited a poor melt tension. Therefore, it was impossible to continuously produce the solidified gut in a stable condition. The inherent viscosities of the resultant polyetheresters were 0.97 in Comparison Example 1 and 0.95 in Comparison Example 2.

EXAMPLE 2 and Comparison Example 3

In Example 2, the polyetherester produced in Example 1 was fed into an extruder having a 65 mm $\phi$ screw and melted therein at a temperature of 240° C. The melted polyetherester was extruded through a coathanger-shaped die so as to form a sheet having a thickness of 1 mm and the resultant sheet was taken up at a velocity of 0.75 m/min by a pair of delivery rollers. A soft elastic sheet was obtained. It was observed that the variance in thickness of the sheet in a machinery direction was within ± 0.5%. That is, the thickness of the sheet was very even.

In Comparison Example 3, the same procedures as those mentioned above were carried out by using the polyetherester of Comparison Example 1 in place of that of Example 1. It was observed that where the take-up speed was 0.75 m/min, the sheet-shaped stream of the melted polyetherester was frequently broken and, therefore, it failed to obtain the quality of the sheet of the polyetherester of Comparison Example 1. When the take-up operation was carried out at a speed of 0.35 m/min, it was successful in producing a sheet without breakage. The sheet thus obtained exhibited a very large variance in thickness, in a range of ± 45%.

EXAMPLE 3 AND COMPARISON EXAMPLES 4 AND 5

In Example 3, procedures identical to those described in Example 1 were carried out, except that the starting polymerization mixture contained 94.5 parts of dimethyl terephthalate, 41.5 parts of dimethyl isophthalate, 100 parts of poly(tetramethylene oxide) glycol having a molecular weight distribution variance $\alpha$ of 1.53 and a number average molecular weight of 2,050, and 94.5 parts of 1,4-butanediol, to prepare a polyetherester. The behaviour of the polymerization product during the polymerization process was observed. Also, the behaviour of the stream of the melted polymer during the gut forming operation was observed. The resultant polymer was subjected to a differential scanning calorimetry to determine a melting point (Tm) and a crystallizing point (Tc) of the polymer. In the determination of the Tm and the Tc, the polymer was heated at a rate of 10° C./min up to the melting point (Tm) thereof, and then, the melted polymer was heated to a temperature of 30° C. above the Tm. The melted polymer was kept at this temperature for 5 minutes and, then, cooled at a rate of 10° C./min, so as to allow the melted polymer to crystallize. The crystallizing point (Tc), at which the crystallizing rate of the polymer reached a peak, was measured.

The polymer was pressed at a temperature of 200° C. so as to prepare a number of sheets, each having a thickness of 1 mm. The sheets were used for preparing ASTM No. 3 dumbbell-shaped test specimens. The test specimens were used for determing tensile strength, ultimate elongation, tensile modulus, elastic recoveries at 23° C. and −20° C., and permanent tension set at 70° C.

In the test for elastic recovery, the test specimen was stretched, at a temperature of 23° C. or −20° C., to a length corresponding to twice the original length of the specimen, maintained in the stretched condition for 10 minutes and, then, released from the stretch. After relaxing the specimen for 10 minutes, the elastic recovery of the speciment was determined.

In the test for permanent tension set, the specimen was stretched to a length corresponding to 1.5 times the original length of the specimen at a temperature of 70° C., maintained in the stretched condition for 22 hours and, then released from the stretch. After relaxing for 10 minutes, the permanent set remaining in the specimen was measured.

Furthermore, the inherent viscosity of the polymer was measured.

The results of the above-mentioned tests are shown in Table 1.

In Comparison Examples 4, the same procedures as those mentioned in Example 3 were carried out, except that poly(tetramethylene oxide) glycol, having a number average molecular weight of 980 and a molecular weight distribution variance ($\alpha$) of 1.45, was used. The results of the tests are also shown in Table 1.

In Comparison Example 5, the same procedures as those described in Example 3 were carried out, except that the poly(tetramethylene oxide) glycol used had a number average molecular weight of 3,500 and a molecular weight distribution variance ($\alpha$) of 1.60. The results of the tests are shown in Table 1.

Table 1

| Example | Example 3 | Comparison 4 | Example 5 |
|---|---|---|---|
| Number average molecular weight of poly(tetramethylene oxide)glycol used | 2,050 | 980 | 3,500 |
| Melted polymer | transparent | transparent | milky white |
| Processability of gut | no difficult | no difficult | difficult |
| Differential scanning colorimetry | | | |
| Tm (°C.) | 176 | 166 | 177 |
| Tc (°C.) | 113 | 93 | 115 |
| Δ Tcm (Tm-Tc) (°C.) | 63 | 73 | 61 |
| Mechanical property | | | |
| Tensile strength (kg/cm²) | 310 | 310 | 285 |
| Ultimate elongation (%) | 750 | 730 | 520 |
| Tensile modulus (kg/cm²) | 730 | 800 | 1,210 |
| Elastic recovery | | | |
| at 23° C. (%) | 81 | 74 | 65 |
| at −20° C. (%) | 79 | 60 | 64 |
| Permanent tension set at 70° C. (%) | 54 | 75 | 86 |
| Inherent viscosity of polymer | 1.02 | 1.00 | 0.98 |

EXAMPLES 4 THROUGH 7 AND COMPARISON EXAMPLES 6, 7 AND 8

In each of Examples 4 through 10, a polyetherester was prepared from 174.6 parts of dimethyl terephtalate, 19.4 parts of dimethyl phthalate, 135 parts of 1,4-butanediol and the amount indicated in Table 2, of poly(tetramethylene oxide)glycol having a number average molecular weight of 2,000 and a molecular weight distribution variance (α) as indicated in Table 2, in the same manner as described in Example 1. The results of each of the examples and comparison examples are shown in Table 2.

Table 2

| | | Poly(tetramethylene oxide)glycol | | | | Processability of gut from polymer |
|---|---|---|---|---|---|---|
| | | Molecular weight distribution variance (α) | Content (%) | Melted polymer | Melt tension (g) | |
| Example | 4 | 1.65 | 50 | transparent | 1.3 | not difficult stable |
| | 5 | 1.48 | 50 | " | 1.4 | not difficult stable |
| | 6 | 1.48 | 40 | " | 1.2 | not difficult stable |
| | 7 | 1.48 | 20 | " | 0.83 | not difficult stable |
| Comparison Example | 6 | 1.97 | 50 | milky colored, pearly shining | <0.10 | difficult(*) |
| | 7 | 1.97 | 40 | milky colored, pearly shining | <0.10 | " |
| | 8 | 1.97 | 20 | milky colored, pearly shining | <0.10 | " |

Note:
(*)-Due to significant Barus effect, extrusion operation for polymer is unstable.

TABLE 3
TESTING METHOD FOR CHEMICAL ANALYSIS OF PTMG

| Property | Test Procedure |
|---|---|
| OH Value (KOH mg/g) | Two grams of poly(tetramethylene oxide)glycol (PTMG) are weighed out in an Erlenmeyer flask. To the flask are added 5 mls of an acetylating agent (a pyridine solution containing 25 grams of acetic anhydride per 100 mls). An air condenser is attached to the flask. It is then immersed in an oil bath heated to 95-100° C. for one hour. Then one ml of distilled water is added from the top of the air condenser and the solution is heated subsequently for 10 minutes. The solution is removed from the oil bath and is allowed to stand for 10 minutes. 5 mls of acetone are added from the top of the air condenser to wash the inside of the condenser and the air condenser is removed. To the solution are added a few drops of phenolphthalein as an indicator and the solution is then titrated with N/2 alcoholic KOH to the point where a light pink color does not disappear. A blank test is run in the same manner. |

CALCULATIONS

OH Value (KOH mg/g) =

$$\frac{(B - A) \times f \times 28.05}{\text{wt. of sample}} + \text{Acid Value}$$

where A is the amount of N/2-KOH (mls) required for the titration, B is for the titration of the blank test, and f is a factor of the N/2-K)H solution. The number average molecular weight can be calculated from the OH value as follows:

$$M_n = \frac{56.1 \times 2 \times 1,000}{\text{OH value}}$$

| | |
|---|---|
| Mn | |
| Acid Value (KOH mg/g) | Ten grams of PTMG are dissolved in 50 mls of a mixed (2:1 mixture of ethanol and benzene, adjusted to neutral by N/10-NaOH). To this solution are added a few drops of phenolphthalein as an indicator, and it is then titrated with |

TABLE 3-continued

TESTING METHOD FOR CHEMICAL ANALYSIS OF PTMG

| Property | Test Procedure |
|---|---|
| | N/10-NaOH to the point where a light pink color does not disappear. |
| | CALCULATIONS |
| | Acid Value (KOH mg/g) = $\dfrac{\text{mls of NaOH} \times f \times 5.61}{\text{wt. of sample}}$ |

What we claim is:

1. A polyetherester block copolymer comprising:
   (1) 50 to 95% by weight of polyester block segments comprising:
      (A) a dicarboxylic acid component which comprises at least 70 molar percent of at least one aromatic dicarboxylic acid having a molecular weight of 300 or less and including, as an indispensable dicarboxylic acid component, at least 50 molar percent of terephthalic acid, and which is polycondensed with:
      (B) a diol component which comprises at least 70 molar percent of at least one aliphatic diol having a molecular weight of 250 or less and including, as an indispensable diol component at least 50 molar percent of 1,4-butane-diol,
      said polyester block segments being block polycondensed with:
   (2) 5 to 50% by weight of polyether block segments comprising poly(tetramethylene oxide)glycol,
   characterized in that said poly(tetramethylene oxide)glycol has a number average molecular weight of from 1,500 to 2,500 and a variance ($\alpha$) in molecular weight distribution, satisfying the equation (1):

$$\alpha = Mv/Mn < 1.70 \quad (1)$$

wherein Mn represents a number average molecular weight of said poly(tetramethylene oxide) glycol and Mv represents a viscosity average molecular weight of said poly(tetramethylene oxide)glycol, defined by the equation (2):

$$Mv = \text{anti log}(0.493 \log \mu + 3.0646) \quad (2)$$

wherein $\mu$ represents a melt viscosity in poise of said poly(tetramethylene oxide)glycol at a temperature of 40° C.

2. A polyetherester block copolymer as claimed in claim 1, wherein said polyester block segments contain at least 50 molar percent of buthylene terephthalate.

3. A polyetherester block copolymer as claimed in claim 1, wherein said aromatic dicarboxylic acid other than terephthalic acid, is selected from the group consisting of isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid and 3-sulphoisophthalic acid.

4. A polyetherester block copolymer as claimed in claim 1, wherein said dicarboxylic acid component comprises, in addition to said aromatic dicarboxylic acid, 30 molar percent or less of at least one member selected from the group consisting of cycloaliphatic and aliphatic dicarboxylic acids.

5. A polyetherester block copolymer as claimed in claim 1, wherein said aliphatic diol is selected from the group consisting of ethylene glycol, trimethylene glycol, pentamethylene glycol, hexamethylene glycol, neopentyl glycol and decamethylene glycol.

6. A polyetherester block copolymer as claimed in claim 1, wherein said diol component comprises, in addition to said aliphatic diol, 30 molar percent or less of at least one member selected from the group consisting of cycloaliphatic and aromatic diols.

7. A polyetherester block copolymer as claimed in claim 1, wherein the logarithmic viscosity of said copolymer if 0.6 or more which has been determined at a concentration of 0.5% by weight in 0-chlorophenol at a temperature of 30° C.

8. A polyetherester block copolymer as claimed in claim 7, wherein said inherent viscosity of said copolymer is in a range of from 0.9 to 3.0.

9. A polyetherester block copolymer as claimed in claim 1, wherein the number average molecular weight of said copolymer is 15,000 or more.

10. A polyetherester block copolymer as claimed in claim 9, wherein said number average molecular weight of said copolymer is in a range of from 20,000 to 100,000.

11. A polyetherester block copolymer as claimed in claim 1, wherein the proportion of said polyether block segments is in a range of from 25 to 45% by weight.

12. A process for producing a polyetherester block copolymer comprising:
   (1) 50 to 95% by weight of polyester block segments comprising:
      (A) a dicarboxylic acid component which comprises at least 70 molar percent of at least one aromatic dicarboxylic acid having a molecular weight of 300 or less and including, as an indispensable dicarboxylic acid component, at least 50 molar percent of terephthalic acid, and which is polycondensed with:
      (B) a diol component which comprises at least 70 molar percent of at least one aliphatic diol having a molecular weight of 250 or less and including, as an indispensable diol component, at least 50 molar percent of 1,4-butane-diol,
      said polyester block segments being polycondensed with:
   (2) 5 to 50% by weight of polyether block segments comprising poly(tetramethylene oxide)glycol,
   which process comprises the steps of:
      (a) bringing at least one lower alcohol diester of said dicarboxylic acid component into a catalytical ester-interchange reaction with said diol component and said poly(tetramethylene oxide)glycol, and;
      (b) catalytically block polycondensing the ester-interchange reaction products to prepare said polyetherester block copolymer, and
   which process is characterized in that said poly(tetramethylene oxide)glycol has a number average molecular weight of from 1,500 to 2,500 and a variance ($\alpha$) in molecular weight distribution, satisfying the equation (1):

$$\alpha = Mv/Mn < 1.70 \quad (1)$$

wherein Mn represents a number average molecular weight of said poly(tetramethylene oxide)glycol and Mv represents a viscosity average molecular weight of said poly(tetramethylene oxide)glycol, defined by the equation (2):

$$Mv = \text{anti log}(0.493 \log \mu + 3.0646) \qquad (2)$$

wherein $\mu$ represents a melt viscosity in poise of said poly(tetramethylene oxide)glycol at a temperature of 40° C.

13. A process as claimed in claim 12, wherein said ester-interchange reaction and said block polycondensation reaction are carried out in the presence of a catalyst comprising at least one member selected from the group consisting of tetralkyl titanates, alkali metal-titanium oxalates, dibutyl tin oxide, dibutyl tin salts of fatty acids and lead salts of aliphatic acids.

14. A process as claimed in claim 12, wherein said ester-interchange reaction is carried out at a temperature of from 160° to 230° C.

15. A process as claimed in claim 12, wherein said block polycondensation reaction is carried out at a temperature of from 210° to 270° C.

16. A process for producing a polyetherester block copolymer comprising:
 (1) 50 to 95% by weight of polyester block segments comprising:
  (A) a dicarboxylic acid component which comprises at least 70 molar percent of at least one aromatic dicarboxylic acid having a molecular weight of 300 or less and including, as an indispensable dicarboxylic acid component, at least 50 molar percent of terephthalic acid, and which is polycondensed with:
  (B) a diol component which comprises at least 70 molar percent of at least one aliphatic diol having a molecular weight of 250 or less and including, as an indispensable diol component, at least 50 molar percent of 1,4-butane-diol,
  said polyester block segments being polycondensed with:
 (2) 5 to 50% by weight of polyether block segments comprising poly(tetramethylene oxide)glycol,
 which process comprises the steps of:
  (a) catalytically esterifying said diol component compound and said poly(tetramethylene oxide)glycol with said dicarboxylic acid component compound, and;
  (b) catalytically block polycondensing the esterification products, and
 which process is characterized in that said poly(tetramethylene oxide)glycol has a number average molecular weight of from 1,500 to 2,500 and a variance ($\alpha$) in molecular weight distribution, satisfying the equation (1):

$$\alpha = (Mv/Mn) < 1.70 \qquad (1)$$

wherein Mn represents a number average molecular weight of said poly(tetramethylene oxide)glycol and Mv represents a viscosity average molecular weight of said poly(tetramethylene oxide)glycol, defined by the equation (2):

$$Mv = \text{anti log}(0.493 \log \mu + 3.0646) \qquad (2)$$

wherein $\mu$ represents a melt viscosity in poise of said poly(tetramethylene oxide)glycol at a temperature of 40° C.

17. A process as claimed in claim 16, wherein said esterification reaction and said block polycondensation reaction are carried out in the presence of a catalyst comprising at least one member selected from the group consisting of tetralkyl titanates, alkali metal-titanium oxalates, dibutyl tin oxide, dibutyl tin salts of fatty acids and lead salt of aliphatic acids.

18. A process as claimed in claim 16, wherein said esterification is carried out at a temperature of from 160° to 235° C.

19. A process as claimed in claim 16, wherein said esterification is carried out at a temperature of from 210° to 270° C.

20. A process for producing a polyetherester block copolymer comprising:
 (1) 50 to 95% by weight of polyester block segments comprising:
  (A) a dicarboxylic acid component which comprises at least 70 molar percent of at least one aromatic dicarboxylic acid having a molecular weight of 300 or less and including, as an indispensable dicarboxylic acid component, at least 50 molar percent of terephthalic acid, and which is polycondensed with:
  (B) a diol component which comprises at least 70 molar percent of at least one aliphatic diol having a molecular weight of 250 or less and including, as an indispensable diol component, at least 50 molar percent of 1,4-butane-diol,
  said polyester block segments being polycondensed with:
 (2) 5 to 50% by weight of polyether block segments comprising poly(tetramethylene oxide)glycol,
 which process comprises the steps of:
  (a) catalytically polycondensing said dicarboxylic acid component compound with said diol component compound, and;
  (b) catalytically block polycondensing said polycondensation product of step (a) with said poly(tetramethylene oxide)glycol,
 and which process is characterized in that said poly(tetramethyleneoxide)glycol has a number average molecular weight of from 1,500 to 2,500 and a variance ($\alpha$) in molecular weight distribution, satisfying the equation (1):

$$\alpha = (Mv/Mn) < 1.70 \qquad (1)$$

wherein Mn represents a number average molecular weight of said poly(tetramethylene oxide)glycol and Mv represents a viscosity average molecular weight of said poly(tetramethylene oxide)glycol, defined by the equation (2):

$$Mv = \text{anti log}(0.493 \log \mu + 3.0646) \qquad (2)$$

wherein $\mu$ represents a melt viscosity in poise of said poly(tetramethylene oxide)glycol at a temperature of 40° C.

21. A process as claimed in claim 20, wherein said polycondensation reaction and said block polycondensation reaction are carried out in the presence of a catalyst comprising at least one member selected from the group consisting of tetralkyl titanates, alkali metal-titanium oxalates, dibutyl tin oxide, dibutyl tin salts of fatty acids and lead salts of aliphatic acids.

22. A process as claimed in claim 20, wherein said polycondensation is carried out at a temperature of from 210° to 270° C.

23. A process as claimed in claim 20, wherein said block polycondensation is carried out at a temperature of from 200° to 250° C.

* * * * *

UNITED STATES PATENT AND TRADEMARK OFFICE
CERTIFICATE OF CORRECTION

PATENT NO. : 4,251,652
DATED : February 17, 1981
INVENTOR(S) : Chiaki Tanaka et al.

It is certified that error appears in the above—identified patent and that said Letters Patent is hereby corrected as shown below:

Column 7, line 23, delete "inveniton" and insert --invention--.

Column 10, line 65, delete "condenser" and insert --cooler--.

Column 11, line 68, delete "condenser" and insert --cooler--.

Column 12, Table 3, line 7, delete "condenser" and insert --cooler--. (in both occurrences).

line 8, delete "condenser" and insert --cooler--.

Signed and Sealed this

Eleventh Day of August 1981

[SEAL]

Attest:

GERALD J. MOSSINGHOFF

Attesting Officer

Commissioner of Patents and Trademarks